(12) United States Patent
Best

(10) Patent No.: US 11,797,718 B2
(45) Date of Patent: Oct. 24, 2023

(54) ANTI-TAMPER SHIELD BASED ON STRINGS OF SERIES RESISTORS

(71) Applicant: CRYPTOGRAPHY RESEARCH, INC., San Jose, CA (US)

(72) Inventor: Scott C. Best, Palo Alto, CA (US)

(73) Assignee: Cryptography Research, Inc., San Jose, CA (US)

( * ) Notice: Subject to any disclaimer, the term of this patent is extended or adjusted under 35 U.S.C. 154(b) by 0 days.

(21) Appl. No.: 17/633,534

(22) PCT Filed: Aug. 21, 2020

(86) PCT No.: PCT/US2020/047512
§ 371 (c)(1),
(2) Date: Feb. 7, 2022

(87) PCT Pub. No.: WO2021/041257
PCT Pub. Date: Mar. 4, 2021

(65) Prior Publication Data
US 2022/0358253 A1 Nov. 10, 2022

Related U.S. Application Data

(60) Provisional application No. 62/890,842, filed on Aug. 23, 2019.

(51) Int. Cl.
*G06F 21/00* (2013.01)
*G06F 21/87* (2013.01)
(52) U.S. Cl.
CPC .................................. *G06F 21/87* (2013.01)

(58) Field of Classification Search
CPC ....................................................... G06F 21/87
See application file for complete search history.

(56) References Cited

U.S. PATENT DOCUMENTS 6,246,970 B1 * 6/2001 Silverbrook .......... H01L 23/576
702/191
8,143,705 B2 3/2012 Van Geloven et al.
9,071,446 B2 6/2015 Kreft
(Continued)

OTHER PUBLICATIONS

Christoph Bohm et al., "Physical Unclonable Functions in Theory and Practice", Springer Science & Business Media New York 2013, Chapter 6.2.1 pp. 124-125.
(Continued)

*Primary Examiner* — Jeffrey C Pwu
*Assistant Examiner* — Thong P Truong
(74) *Attorney, Agent, or Firm* — Lowenstein Sandler LLP

(57) ABSTRACT

A resistor mesh with distributed sensing points is provided in a security chip as an anti-tamper shield. An analog multiplexing circuit is configured to receive a pair of digital selection values created by an algorithm processing circuit, and produce a respective differential voltage formed by a pair of voltages obtained at a pair of selected sensing points within the resistor mesh corresponding to the pair of digital selection values. Each differential voltage is converted into a corresponding digital output value. An algorithm processing circuit is configured to receive a respective digital output value associated with each pair of digital selection values and derive a binary value based on a subset of the digital output values, wherein the binary value is unique to the security chip.

20 Claims, 7 Drawing Sheets

(56) References Cited

U.S. PATENT DOCUMENTS

| | | | |
|---|---|---|---|
| 2001/0033012 A1 | 10/2001 | Kommerling et al. | |
| 2006/0271792 A1 | 11/2006 | Devadas et al. | |
| 2013/0104252 A1* | 4/2013 | Yanamadala | G06F 21/76 |
| | | | 726/34 |
| 2014/0327468 A1 | 11/2014 | Pfeiffer et al. | |
| 2018/0337793 A1 | 11/2018 | Park et al. | |

OTHER PUBLICATIONS

Notification of Transmittal of the International Search Report and the Written Opinion of the International Searching Authority, or the Declaration dated Nov. 19, 2020 re: Int'l Appln. No. PCT/US2020/047512. 22 pages.

* cited by examiner

ANTI-TAMPER SHIELD BASED ON STRINGS OF SERIES RESISTORS

BRIEF DESCRIPTION OF THE DRAWINGS

The present disclosure will be understood more fully from the detailed description given below and from the accompanying drawings of various implementations of the disclosure.

DETAILED DESCRIPTION

Figure 1A:
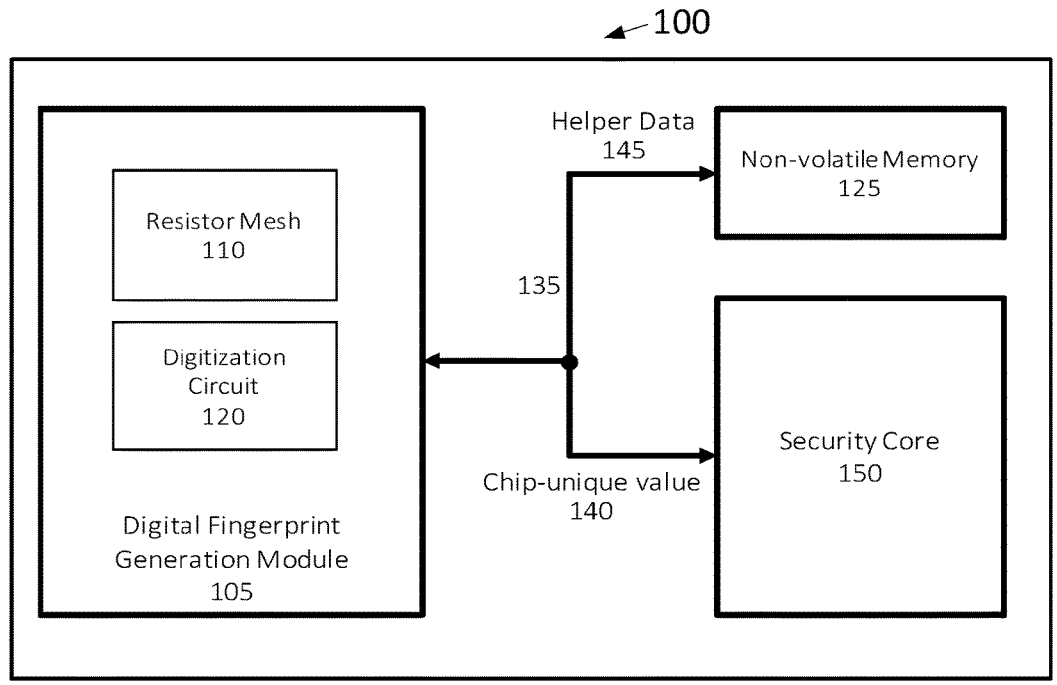
FIG. 1A is a block diagram of the key functional components of an example security chip, in accordance with some embodiments of the present disclosure.

Aspects of the present disclosure are directed to configurations of a resistor mesh comprising metallic traces formed within one or more metal layers in an integrated circuit (IC). The metallic traces are arranged in physical configurations that substantially cover an external side (e.g., front side, back side, or both sides) of the IC. The resistor mesh comprises parallel strings of series resistors between two voltage terminals. Aspects of the present disclosure are also directed to derivation of a chip-unique value acting as a digital fingerprint of the IC, where the chip-unique value is derived from random variations in the resistance of the metallic traces forming the resistor mesh.

The IC may be a security chip with a storage memory containing secure data which the security chip maker intends to protect from invasive attacks by malicious actors. The resistor mesh, when combined with a digitization circuit that outputs the chip-unique value, acts as an anti-tamper shield, as any change in the physical configuration of the resistor mesh (e.g., due to an invasive attack) alters the digital fingerprint of the security chip, indicating that a malicious actor may have attempted to tamper with the security chip.

Alternatively, the operation of the security chip could be programmed in such a way that depends on an original digital fingerprint established during an early life cycle of the chip (e.g., during secure manufacturing); should the chip-unique value change in the future (e.g., due to an invasive attack), the operation of the security chip would also change.

An invasive attack on a security chip may be passive in nature (e.g., monitoring electrical traffic on critical signal buses, monitoring infrared emissions of the internal circuits, etc.), or, may be active in nature, where new electrical signals are injected into the chip to corrupt secure operations within the chip, and/or extract secret data. One common way a malicious actor may follow to perform an invasive attack on a security chip is by using a Focused Ion Beam (FIB) to mill through one or more metal and/or oxide layers on a front (or back) side of the security chip to access the underlying circuitry. Another way to conduct an invasive attack is to remove one or more outermost metal layers of the security chip by Chemical Mechanical Polishing (CMP) or other abrasive techniques to access the underlying circuitry. For example, malicious actors may fully or partially remove some of the top metal layers to access sensitive circuit structures, and then use FIB edits to disable a traditional mesh-continuity alarm circuit that warns against a tamper attempt. Placing the resistor mesh of the anti-tamper shield at the top of the security chip ensures that the attempted invasive attack modifies at least part of the physical configuration of resistor mesh, which changes the digital fingerprint of the circuit.

Sophisticated malicious actors may use FIBs or other tools to restore the configuration of the resistor mesh as closely as possible to the original configuration by redepositing metal on the affected portions of the resistor mesh once the targeted attack regions have been exposed (e.g., via FIB or CMP). However, the resistance of metal that is deposited during FIB editing is difficult to control. The challenge is to design a resistor mesh and associated digitization circuit that can derive a binary number which is highly sensitive to even the minutest local changes in the resistance, physical layout, or other attributes of the resistor mesh.

Aspects of the present disclosure address the above and other challenges by providing a novel configuration of an anti-tamper shield combining a resistor mesh (covering a front side or a back side of a security chip) with a digitization circuit that derives a chip-unique value from differential voltages obtained from the resistor mesh during an enrollment phase of a security chip. If the security chip can regenerate that chip-unique value at a subsequent time, it can be concluded that the security chip has likely not been compromised, i.e., the anti-tamper shield remained intact from the time the enrollment phase was completed. On the other hand, if the security chip subsequently generates a binary number that differs from the chip-unique value generated during the earlier enrollment phase, then it can be concluded that the security chip may have been tampered with. Aspects of the present disclosure provide resistor meshes where altering even a highly localized portion of the mesh affects many bits of the chip-unique value.

FIG. 1A is a block diagram of the key functional components of an example security chip 100, in accordance with some embodiments of the present disclosure. Security chip 100 may comprise a digital fingerprint generator module 105, which is electrically coupled with both an on-chip security core 150 and non-volatile memory 125 via an interconnect bus 135. The digital fingerprint generator module 105 may comprise a resistor mesh 110 and a digitization circuit 120. In general terms, the digital fingerprint generator module 105 may comprise what is generally known as a Physically Unclonable Function (PUF) circuit. A PUF circuit is generally one that creates a chip-unique value based on on-chip physical variations which occur naturally during semiconductor manufacturing. For example, the metallic traces of the resistor mesh 110 can be used by a PUF circuit to calculate a chip-unique value 140 based on the variation of material properties and dimensions of the metallic traces constituting parallel strings of resistors. Measuring a sufficient number of differential voltages ($V_{diff}$) within the strings of the resistor mesh 110 may be used by the PUF circuit to generate a chip-unique value 140 for the security chip 100. The chip-unique value is usually represented as a large binary number (e.g., at least 32-bits, usually 128-bits). In one embodiment of the present disclosure, the digital fingerprint generator module 105 is referred to as a "PUF-in-mesh" circuit because of the configuration of the resistors in the form of a mesh of parallel resistor strings. Note that in some embodiments the interconnect bus 135 may be a chip fabric, such as one based on the Advanced Microcontroller Bus Architecture (AMBA) standard. In other embodiments, an interconnect between the digital fingerprint generator module 105 and the security core 150 is physically separate from the interconnect to the non-volatile memory 125. Also, while non-volatile memory 125 is shown as being on-chip in this figure, it may in some embodiments be realized in off-chip memory.

The digital fingerprint generator module 105 may rely on non-volatile memory 125 to store helper data 145 calculated during the enrollment phase of the digital fingerprint generator module 105. During a subsequent regeneration phase, the digital fingerprint generator module 105 may use this helper data 145 to determine the chip-unique value 140. This chip-unique value 140, which is the digital fingerprint of the security chip 100, may be transmitted to an on-chip security core 150 via interconnect 135. The chip-unique value 140 may a 128-bit binary number that can be used as a cryptographic key (or as a portion of a cryptographic key) by the security core 150 to, for example, encrypt secure data stored within on-chip non-volatile memory 125 and/or to decrypt encrypted data retrieved from on-chip non-volatile memory 125 (or other off-chip storage memory) during a secure operation. A malicious actor who wishes to decrypt information recovered from on-chip non-volatile memory 125 may attempt to measure the chip-unique value 140 by probing the interconnect 135. However, since the probes are likely to affect at least a part of the resistor mesh 110 disposed at a front side or back side of the security chip 100, the binary number derived from a physically altered resistor mesh 110 will not be the same as the original digital fingerprint of the security chip 100, so the adversary's decryption attempt will fail.

Figure 1B:
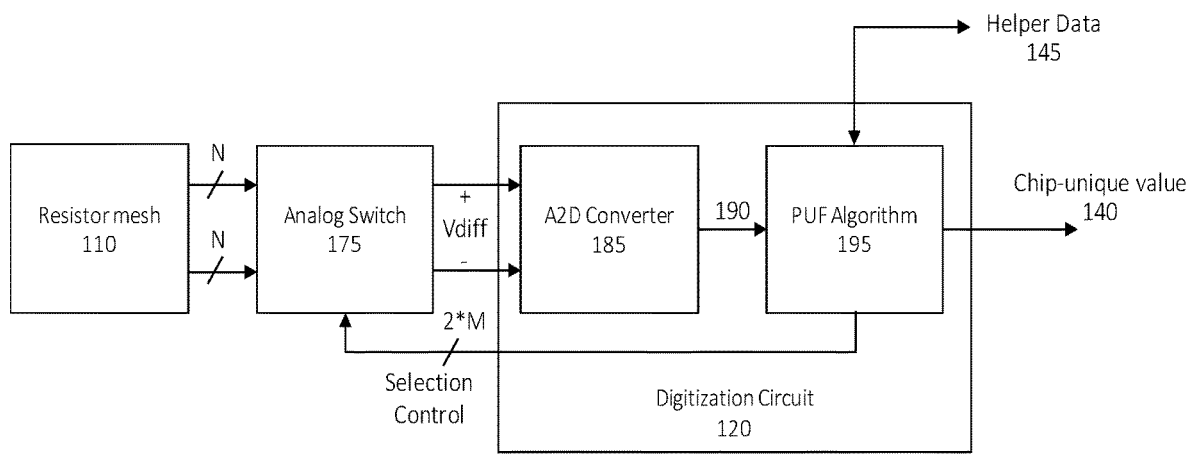
FIG. 1B is a block diagram of an example circuit that generates a chip-unique value from differential voltage measurements performed on a resistor mesh in the security chip, in accordance with an embodiment of the present disclosure.

FIG. 1B shows details of sample digitization circuit 120 within digital fingerprint generator module 105, in accordance with an embodiment of the present disclosure. A number of voltages from different sensing points (shown in FIGS. 2-3) on the resistor mesh 110 can be selected, including a first set of "N" selections which represent an upper voltage in a differential voltage measurement, and a second set of "N" selections which represent a lower voltage in a differential voltage measurement. Note that by selecting both an upper and lower voltage, a differential voltage is obtained. In such an embodiment, the term "upper voltage" indicates a first voltage selected at a first sensing point, and the term "lower voltage" indicates a second voltage selected at a second sensing point. An analog multiplexing switch, 175 receives a first M-bit value to select one of the "N" upper voltages, as well a second M-bit value to select one of the "N" lower voltages. For example, in one embodiment, there may be N=256 upper voltages to choose from, and the selection control signal (associated with a digital control value) would use an 8-bit signal (i.e., M=8) to select between them. In this embodiment, there are also N=256 lower voltages that are selected via a second 8-bit selection control signal. In other embodiments, the number of "N" upper voltages that can be selected from may not be the same as the number of lower voltages; in this embodiment, the number of bits in the M-bit signal might be different between the upper and lower selection paths. Furthermore, in some embodiments the number of series resistors in each parallel string need not be the same. After selection, a differential voltage ($V_{diff}$) value will thus appear at the output of the analog multiplexing switch 175, where $V_{diff}$ represents the difference between voltages at corresponding sensing points located within the mesh. In a non-limiting example, a resistor mesh can be formed using 8 parallel strings of resistors, which each string is formed with 31 metal resistors in series. In this embodiment, each string has a total of 32 possible sensing points (this can be observed in FIGS. 2 and 3) yielding a total of 256 possible sensing points for an 8-string mesh. From these 256 possible sensing points, the total number of unique differential voltage measurements that can be obtained depends on the number of sensing points spanned by the differential voltage measurement. For example, if the span (also referred at as window, and indicated as "w" in FIGS. 2-3) is set to be 8 (where each string comprising 32 sensing points), then there are 24 values of $V_{diff}$ that can be measured within each string. Since there are 8 nominally identical strings, the total number of unique differential measurements that can be obtained from the mesh is much larger: 24 times $8^2$, or 1536. Due to random variation in the dimensions of the metallic traces forming the resistor mesh 110 during manufacturing, the measured $V_{diff}$ values from the resistor strings will have a Gaussian distribution around a peak nominal value. An analog-to-digital converter (also known as A2D converter) 185 can convert the analog $V_{diff}$ values to corresponding digital values 190, which may be processed by a PUF algorithm circuit 195. This PUF algorithm circuit may statistically analyze the converted digital values 190 (for example, the 1536 digital values generated by the A2D converter 185) to generate the chip-unique value 140 that is the digital signature of the security chip 100. For example, in an embodiment, a 128-bit binary number may be generated from 1536 differential voltage measurements collected from the 256 sensing points in an 8-string resistor mesh (with 31 resistors per string) by determining the values that lie beyond a 3-sigma statistical spread of the Gaussian distribution, and those outlying values may be used by the PUF algorithm circuit 195 to generate the 128-bit binary number. Note that during the enrollment phase of the digitization circuit 120, the PUF algorithm circuit 195 may in this embodiment analyze all 1536 values to find 128 measurements that exceed the 3-sigma distribution, and then record the two M-bit values associated with each measurement as part of helper data 145, which is stored in the non-volatile memory 125. Note that prior to storing the data, a Message Authentication Code (MAC) or error-correction value might be calculated and stored along with the data, to prevent the helper data from being easily modified (either accidently or intentionally). Then during regeneration, the PUF algorithm circuit retrieves the helper data 145, optionally verifies the MAC or error-correction value, and then re-measures the $V_{diff}$ value for each of the 128 entries during a regeneration phase. The chip-unique value 140 can then be calculated in a variety of ways; for example, if the $k^{th}$ measurement is smaller than 3-sigma below the average, the value for the $k^{th}$ bit is a "0", while if the measurement is 3-sigma larger than the average, the value for the $k^{th}$ bit is a "1". Other more complicated algorithms may alternatively be used to determine the chip-unique value 140. In some embodiments, the 128-bit output of this measurement step is an intermediate value that is then processed in other ways (e.g., using error correction or hashing algorithms) to produce the final chip-unique value 140. Note that since the helper data 145 contains mostly addresses and support data (e.g., MAC or error-correction values) but not any actual measurement results, it cannot be directly used by an adversary to determine the chip-unique value 140: the helper data at most tells the digitization circuit 120 where to measure in the resistor mesh, but not what the measured $V_{diff}$ would be.

Figure 2:
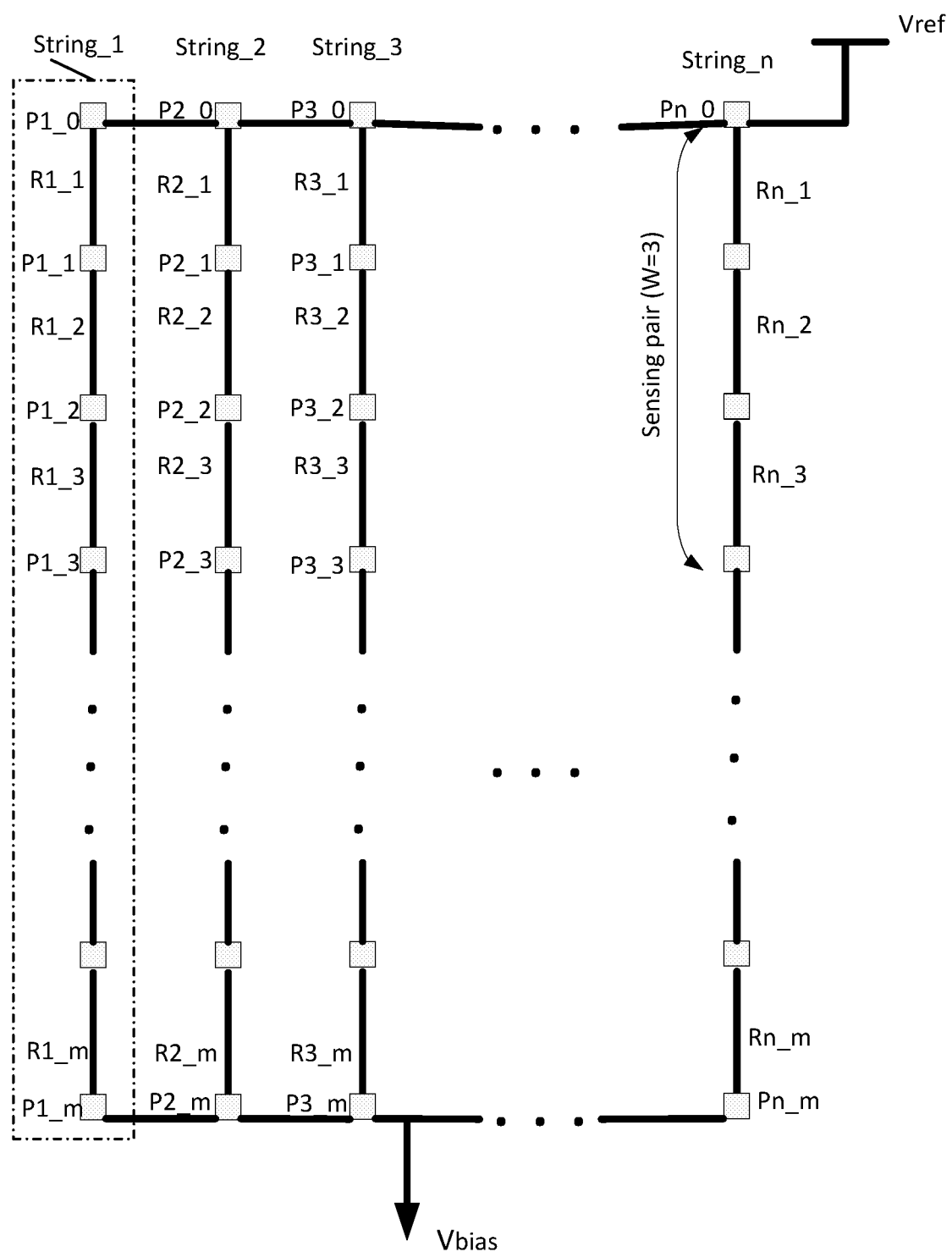
FIG. 2 is an example resistor mesh with distributed sensing points to implement an anti-tamper shield, in accordance with an embodiment of the present disclosure.

FIG. 2 is an example resistor mesh with distributed sensing points P to implement an anti-tamper shield, in accordance with an embodiment of the present disclosure. The resistor mesh comprises 'n' number of parallel strings of resistors (String_1, String_2, . . . , String_n). Each string comprises individual resistors R in series between a common reference voltage $V_{ref}$ at the top of the mesh and a bias voltage $V_{bias}$ at the bottom of the mesh (e.g., achieved via a bias resistor $R_{bias}$ (not shown) to $V_{SS}$). The strings of resistors can be selectively activated by a transistor (not shown) acting as a switch between, for example, $V_{DD}$ and $V_{ref}$. Note that each resistor R is a segment of a metallic trace in between two sensing points P. For example, in String_1 (showed within the dashed outline), there are 'm' number of resistors (R1_1, R1_2, . . . , R1_m) in series, with (m+1) number of sensing points. Resistor R1_1 is in between sensing points P1_0 and P1_1, Resistor R1_2 is in between sensing points P1_1 and P1_2, and so on. In the embodiment shown, the other strings of resistors have the same 'm' number of resistors and (m+1) number of sensing points. In other embodiments not shown, the number of series resistors in each string may be different. Though the resistors within the strings are nominally identical, there will be random variations in resistance due to manufacturing and/or material imperfection. That random variation is leveraged by a PUF algorithm circuit (e.g., circuit 195 shown in FIG. 1B) to generate a chip-unique value that is unique to the security chip and can be used as the digital fingerprint of the security chip. For a resistor mesh with (m+1) sensing points in each string, and 'n' number of parallel strings, the total number of nominally-equipotential differential voltages ("$V_{diff}$") depends on the number of resistors spanned by the differential measurements. Specifically, if a differential is formed with a span of "w" of the "m+1" sensing points, then there are ((m+1)−w) values of $V_{diff}$ that can be measured within each string. For "n" strings in parallel, there are (((m+1)−w)*n²) values of $V_{diff}$ within the whole resistive mesh. Consequently, if any one of the resistors are cut or edited during an invasive attack, it will affect all measurements involving that string, meaning the total number of measurements which are effected is (((m+1)−w)*(2n−1)). For example, for n=8 strings, and (m+1)=32 sensing points per string, where each differential spans w=16 resistors, there are 1024 unique values of $V_{diff}$ obtainable in the mesh, where a single cut or edit will affect 240 of those values (about 23% of the total). Note that the configuration shown in FIG. 2 may be implemented using a single metal layer or in several metal layers. Note also that metal layers on the front side of the chip can protect against front side invasive attacks (e.g., via frontside FIBs), while metal layers on the backside of the chip can protect against backside invasive attacks (e.g., backside FIBs or infrared probing). In some embodiments, backside metal is used to form one or more resistors that comprise a bias resistor ($R_{bias}$ mentioned earlier).

Figure 3:
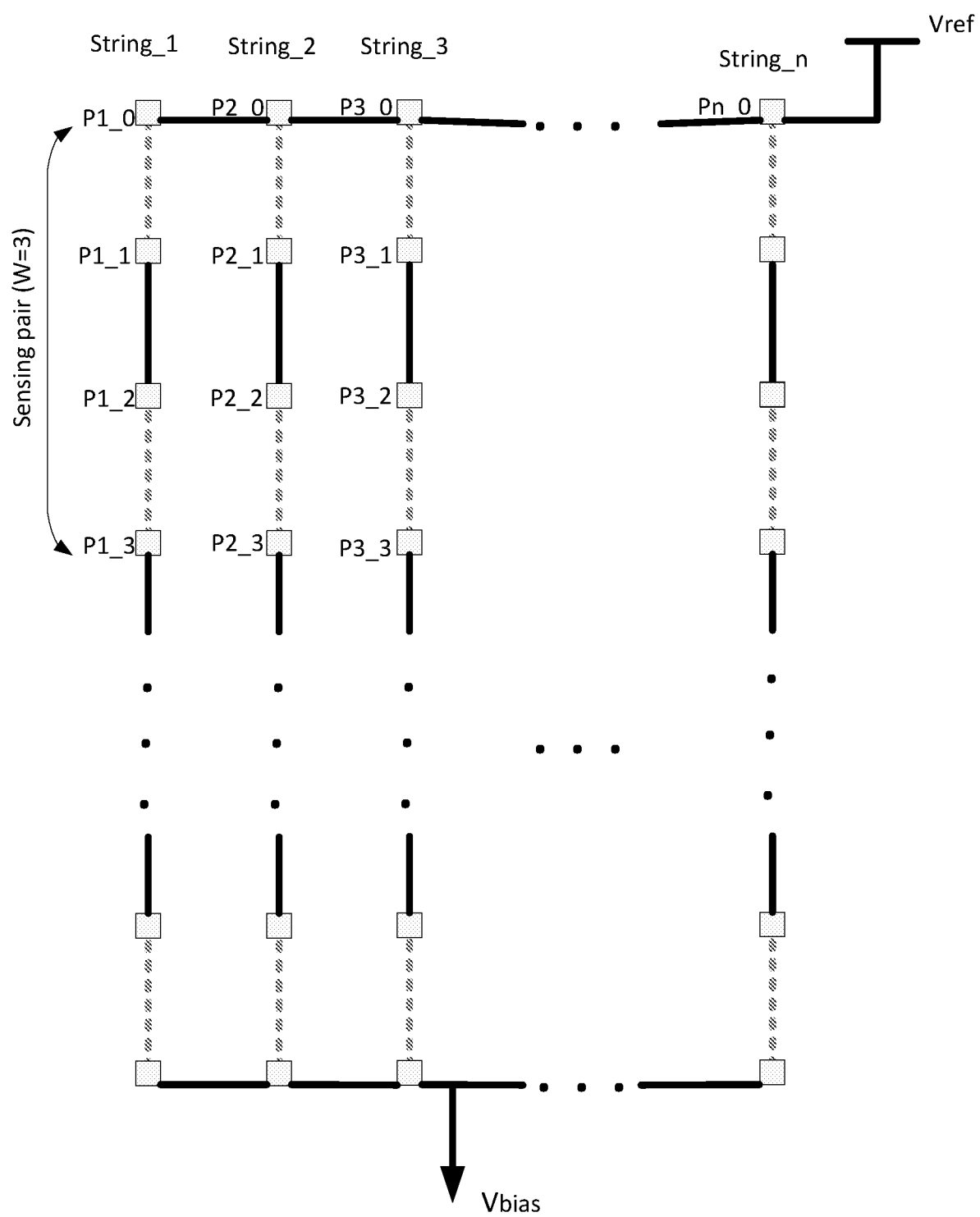
FIG. 3 is an alternative configuration of an example resistor mesh with distributed sensing pairs to implement an anti-tamper shield, in accordance with an embodiment of the present disclosure.

FIG. 3 further illustrates an example resistor mesh with nominally-equipotential sensing pairs distributed among multiple metal layers to implement an anti-tamper shield, in accordance with some embodiments of the present disclosure. The top-most metal layer is shown by a solid line, and the metal layer right below the top-most metal layer is shown with a dashed line. Sensing points P denote locations of metal vias to access resistors on a particular metal layer. A span (or window), denoted by "w", indicates the number of resistors spanned between the sensing points of a sensing pair. For example, sensing points P1_0 and P1_3 collectively constitute a sensing pair with a span w=3, indicating that three resistors are between the sensing points P1_0 and P1_3. In FIG. 3, note that one of the three resistors is formed using the top-layer metal, while 2 of the resistors are formed in the metal layer below the top-most metal layer. Even though the resistors are formed in different layers, sensing pairs in each string can still be selected to have nominally the same differential voltage by design, and tampering with the resistor mesh will result in a change in some of the differential voltages.

With 'm+1' number of sensing points per string and a total of 'n' number of strings, the total number of sensing pairs in a resistor mesh separated by step "w" is: $((m+1)-w)*n^2$. Number of sensing pairs affected by one edit (i.e. when one segment of resistor is cut or modified from one string during an invasive attack) by a malicious actor is: $((m+1)-w)*(2n-1)$. In an example, where there are n=6 strings, and (m+1)=16 sensing points per string, and w=4, there are 432 equipotential sensing pairs, and the edit of one resistor affects 132 sense pairs (about 30% of the total). In essence, the values of 'w', 'm' and 'n' can be changed to tune sensitivity of differential voltage to tampering and alteration of the original resistor mesh.

Figure 4A:
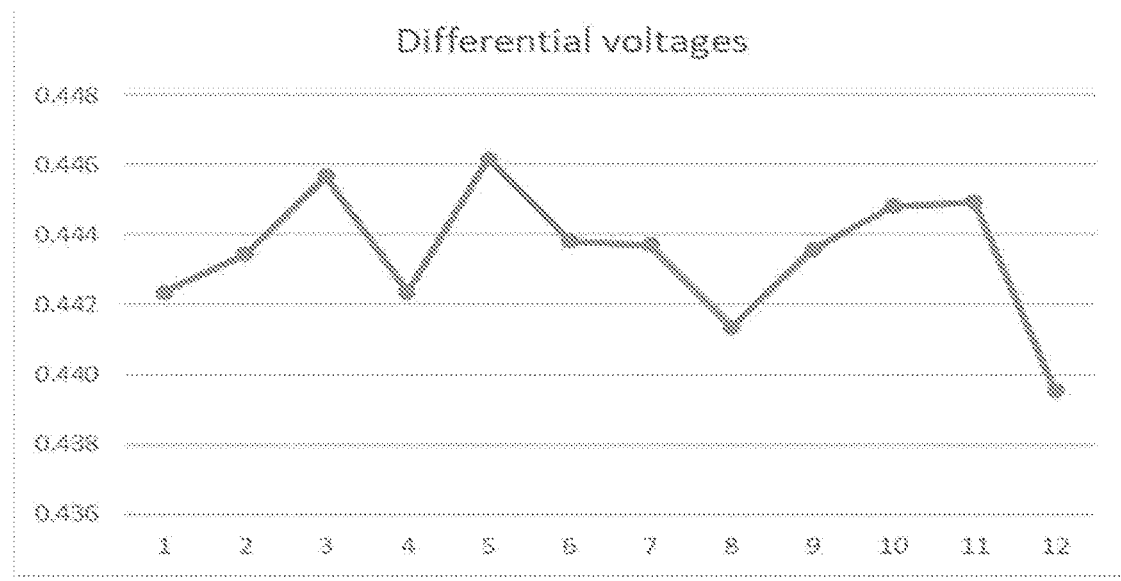
FIG. 4A shows an example simulation result illustrating random variation in differential voltages obtained from metal traces in a resistor mesh in a security chip, in accordance with some embodiments of the present disclosure.

FIG. 4A shows an example simulation result illustrating random variation in differential voltages measured from metal traces in a resistor mesh in a security chip, in accordance with some embodiments of the present disclosure. In this simulation, it is assumed that there are 2 strings, 8 sensing points per string, and a step size w=5. This mesh yields a total of 12 nominally-equipotential sensing pairs generating "Vdiff" values, since $((8-5)*2^2=12)$. For a given metal resistor and Rbias size, the average differential voltage for 12 sensing pairs was 443 mV in this simulation, the nominal resistance value was set at 120 ohms per resistor, and the random variation of each resistor value was set to be +/−5% of nominal. Note while there are too few data points for statistical analysis in this simulation, it can be readily seen that the random variation does lead to a random distribution of the 12 sense pairs.

Figure 4B:
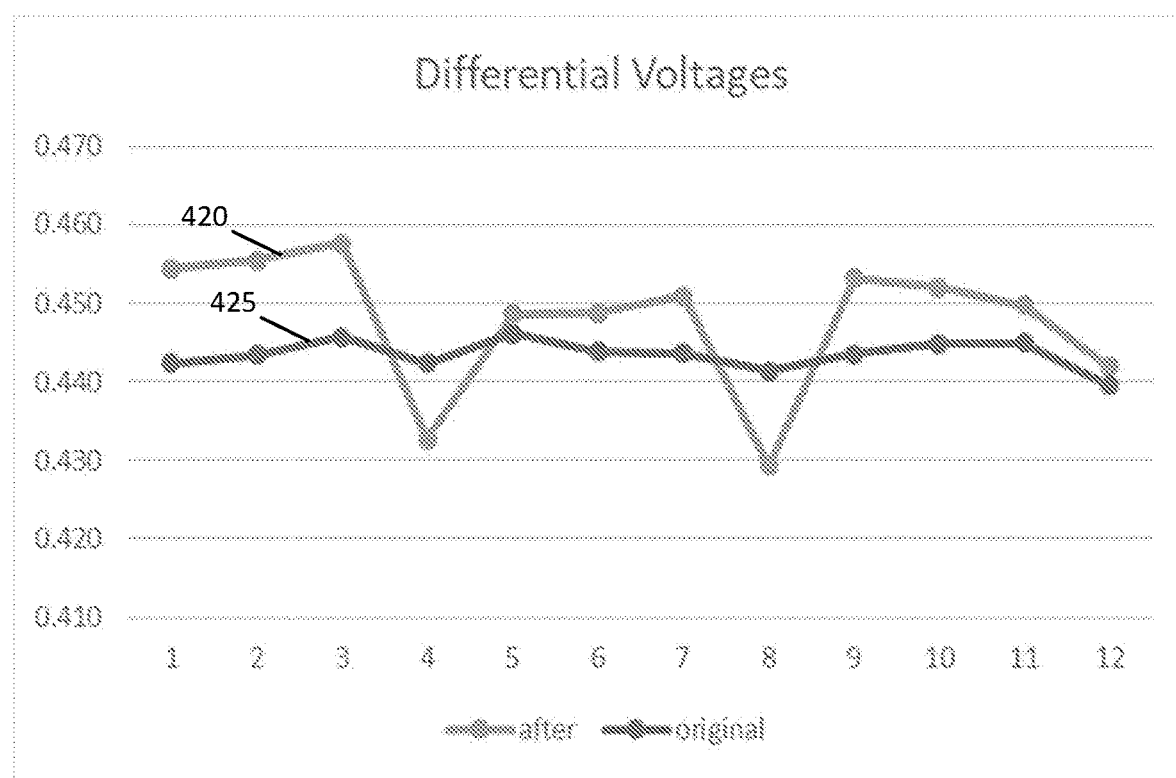
FIG. 4B shows an example simulation result illustrating sensitivity of the resistor mesh when a single resistor in the resistor mesh is changed, in accordance with some embodiments of the present disclosure.

FIG. 4B shows an example simulation result illustrating the sensitivity of the resistor mesh formed by parallel strings of series resistors when a single resistor in the resistor mesh is changed, in accordance with some embodiments of the present disclosure. To simulate the effect of an invasive attack, one resistance value was changed from 120 ohm to 100 ohm. The top curve 420 in FIG. 4B shows the differential voltages after the simulated invasive attack, and the bottom curve 425 shows the differential voltages from the same sensing pairs before the invasive attack (i.e., curve 425 is the curve from FIG. 4A). Note that the voltage at sense pair 1, for example, which prior to the attack was slightly below the mean, rose to be substantially above the mean after the attack. This perceptible change in measured differential voltages can be translated into generating a post-attack value that is different from the chip-unique value generated by the original resistor mesh before the invasive attack.

In general, this disclosure provides a resistor mesh, formed by parallel strings of series resistors, with distributed sensing points that acts as an anti-tamper shield in a security chip. An analog multiplexing circuit is configured to receive a pair of digital selection values created by an algorithm processing circuit, and produce a respective differential voltage formed by a pair of voltages obtained at a pair of selected sensing points within the resistor mesh corresponding to the pair of digital selection values. Each differential voltage is converted by an analog-to-digital converter into a corresponding digital output value. An algorithm processing circuit is configured to receive a respective digital output value associated with each pair of digital selection values and derive a binary value based on a subset of the digital output values, wherein the binary value is unique to the security chip.

Figure 5:
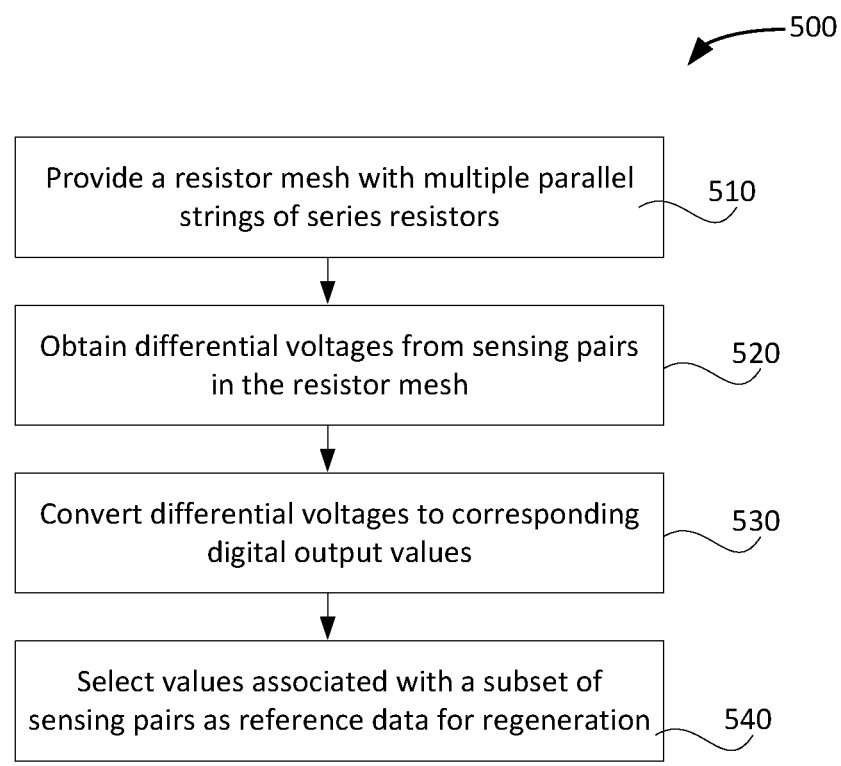
FIG. 5 is a flow diagram of an example method describing enrollment operations performed by the security chip, in accordance with some embodiments of the present disclosure.

FIG. 5 is a flow diagram of an example method 500 describing enrollment operations performed by the security chip, in accordance with some embodiments of the present disclosure. During the enrollment process, a chip-unique value is generated that acts as the digital fingerprint of the security chip as originally manufactured. This chip-unique value may be used to encrypt secure data. The method 500 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, at least some operations of the method 500 may be performed by PUF algorithm circuit 195 within the digitization circuit 120 shown in FIG. 1B.

At operation 510 of the enrollment process, a resistor mesh is provided to a security chip. The resistor mesh constitutes multiple parallel strings of series resistors, as shown in FIGS. 2 and 3. The resistor mesh also has sensing points by which differential voltages may be obtained. The resistor mesh may be analyzed by a PUF algorithm circuit that generates a unique fingerprint for the security chip (e.g. chip-unique value 140) based on the configuration of the resistor mesh, as manufactured, i.e. before any tampering attempt.

At operation 520, a differential voltage data from pairs of sensing points (i.e. sensing pairs) in the resistor mesh is obtained. The differential voltage may be formed by a pair of voltages obtained at a pair of selected sensing points on strings of resistors formed on one or more metal layers (usually including at least the top-most metal layer), as shown in FIGS. 2 and 3. Nominally, the equipotential sensing pairs within the mesh will have equal differential voltages. However, since the metallic traces have random variation in resistance value (due to random and unpredictable effects of the manufacturing process), there is measurable variation in differential voltages between corresponding sensing pairs both intra-string and between different strings.

At operation 530, an analog to digital converter (also known as, "A2D converter") converts differential voltages to corresponding digital output values. For example, A2D Converter 185 in FIG. 1B may perform this operation. These digital values are then processed by a PUF algorithm, for example an algorithm run by the PUF algorithm circuit 195 in FIG. 1B, which may utilize statistical analysis to identify sensing pairs whose differential voltage exceeds a 3-sigma distribution. These sensing pairs are referred to as 3-sigma sensing pairs, and forms a subset of sensing pairs At operation 540, values associated with the subset of the sensing pairs are stored as reference data to be used for the regeneration operation described below with respect to method 600 in FIG. 6. This data may be stored in local non-volatile memory 125, or elsewhere in the security chip 100, or even off-chip. In one embodiment, the reference data for regeneration (also known as, the "helper data" 145 from FIG. 1B) may be the selection control values associated with the 3-sigma sensing pairs in the resistor mesh. A processor or PUF algorithm circuit may then use a binary number generation algorithm to derive a chip-unique value from measurements taken at the stored selection control values. In one embodiment, the binary number generation algorithm might determine the $k^{th}$ bit of the output should be a "0" if the $k^{th}$ measurement at the $k^{th}$ selection control value is smaller than 3-sigma below the average, and is a "1" otherwise. The resulting chip-unique value bears the digital fingerprint of the security chip, and can subsequently be used by other circuitry within the chip (e.g., by the security core, to encrypt secret data being programmed into the non-volatile memory (NVM) during manufacture). In some embodiments, the resulting chip-unique value is processed in other ways (e.g., using error correction or hashing algorithms) to produce the final chip-unique value for use by other circuitry in the chip. Note also that prior to storing the reference data, the processor or PUF algorithm circuit might additionally calculate a MAC or error correction value to prevent the reference data from being easily modified.

Figure 6:
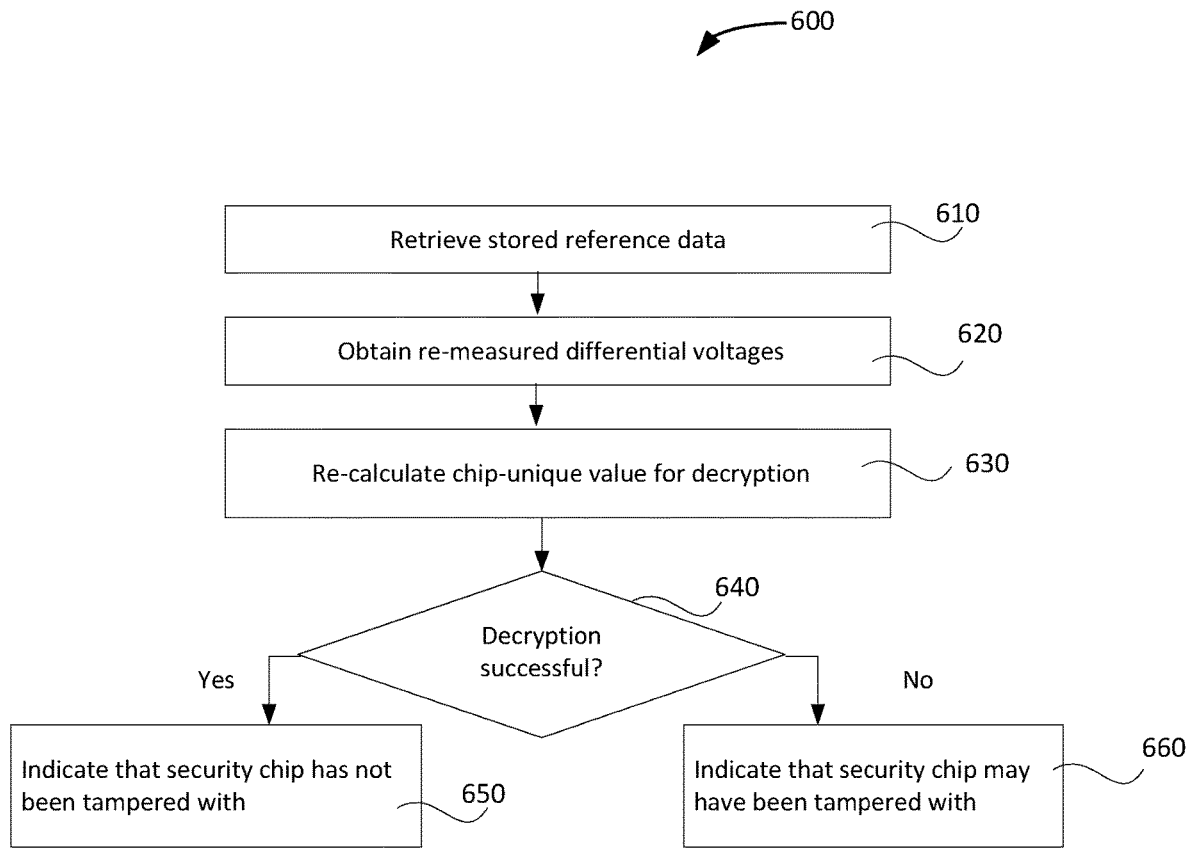
FIG. 6 is a flow diagram of an example method describing regeneration operations performed by the security chip, in accordance with some embodiments of the present disclosure.

FIG. 6 is a flow diagram of an example method 600 describing regeneration operations performed by the security chip, in accordance with some embodiments of the present disclosure. The regeneration process, at a time subsequent to the enrollment process, attempts to regenerate the chip-unique value that was generated during the previously performed enrollment process. The method 600 may be performed by processing logic that may include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 600 may be performed by a processor (not shown) within the PUF algorithm circuit 195 shown in FIG. 1B, or elsewhere within the digital fingerprint generator module 105 shown in FIG. 1A.

At operation 610, the processor (which may be a processor within the security chip 100, or the PUF algorithm circuit within the Digitization Circuit 120 in FIG. 1B) retrieves stored reference data for regeneration (also referred to as helper data 145 in FIG. 1B), as saved in local memory 125, elsewhere in the security chip 100, or even off-chip during the enrollment stage operation 540 described above. Optionally, the processor or PUF algorithm circuit verifies the MAC or error-correction values that may accompany the reference data.

At operation 620, the differential voltages are measured once again between the same pairs of sensing points in the resistor mesh, as indicated by the reference data. A2D Converter 185 in FIG. 1B may perform this operation. In some embodiments, the reference data includes selection control values established during step 540 as selection control values associated with the 3-sigma sensing pairs. Note that this operation takes a subset of the measurements 520 taken during the enrollment process flow shown in FIG. 5. The purpose of this operation is to regenerate differential voltage data (using the reference data) to recalculate the chip-unique value, and thereby implicitly check whether any physical attribute of the resistor mesh has been altered subsequent to the measurements at the same sensing points during the enrollment process.

At operation 630, a processor (which may be a processor within the security chip 100, or the PUF algorithm circuit within the Digitization Circuit 120 in FIG. 1B) may use a binary number generation algorithm to derive a chip-unique value from measurements taken at the stored selection control values during operation 620. In one embodiment, the binary number generation algorithm might determine the $k^{th}$ bit of the output should be a "0" if the $k^{th}$ measurement at the $k^{th}$ selection control value is smaller than 3-sigma below the average, and is a "1" otherwise. The resulting chip-unique value bears the digital fingerprint of the security chip.

The processor delivers the newly-calculated chip-unique value to the security core, which can then use the value as the key (or portion of the key) for a decryption operation. In some embodiments, the newly-calculated chip-unique value is processed in other ways (e.g., using error correction or hashing algorithms) to produce the final chip-unique value for use by the security core.

At operation 640, the security core determines if the decryption is completed successfully. If the security core determines that the decryption operation completed successfully, then the process proceeds towards operation 650. At operation 650, the security core may indicate that the security chip has not been tampered with.

On the other hand, if the security core determines at operation 640 that the decryption operation did not complete correctly, then the process proceeds towards operation 660. At operation 660, the security core may indicate that the security chip may have been tampered with.

Persons skilled in the art will understand that although the flow diagram in FIGS. 5-6 show a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

Figure 7:
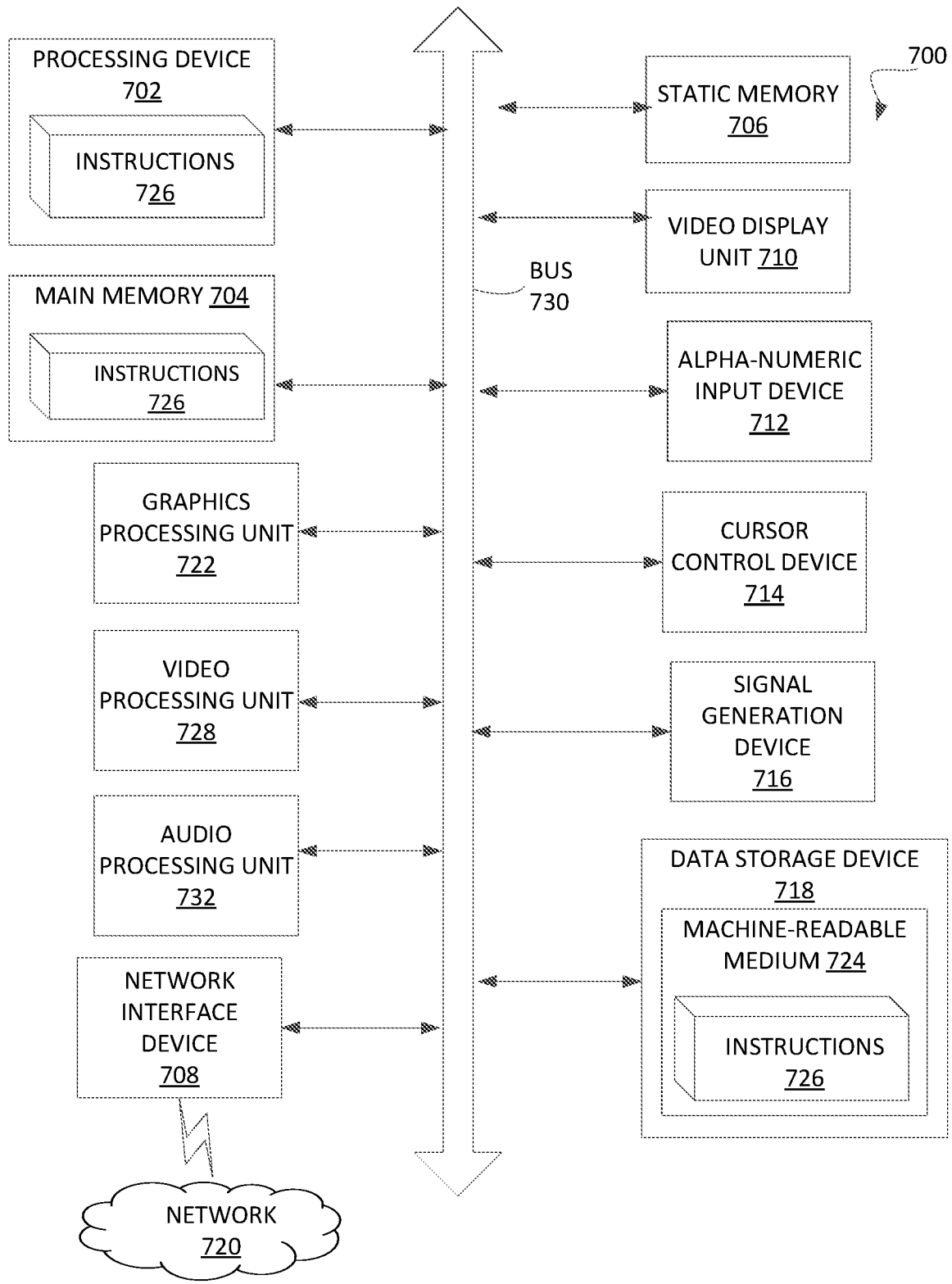
FIG. 7 illustrates a block diagram of a sample computer system in which some embodiments of the disclosure may operate.

FIG. 7 illustrates an example machine of a computer system 700 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 718, which communicate with each other via a bus 730.

Processing device 702 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute instructions 726 for performing the operations and steps discussed herein.

The computer system 700 may further include a network interface device 708 to communicate over the network 720. The computer system 700 also may include a video display unit 710 (e.g., a liquid crystal display (LCD) or a cathode ray tube (CRT)), an alphanumeric input device 712 (e.g., a keyboard), a cursor control device 714 (e.g., a mouse), a graphics processing unit 722, a signal generation device 716 (e.g., a speaker), video processing unit 728, and audio processing unit 732.

The data storage device 718 may include a machine-readable storage medium 724 (also known as a computer-readable medium) on which is stored one or more sets of instructions or software 726 embodying any one or more of the methodologies or functions described herein. The instructions 726 may also reside, completely or at least partially, within the main memory 704 and/or within the processing device 702 during execution thereof by the computer system 700, the main memory 704 and the processing device 702 also constituting machine-readable storage media.

While the machine-readable storage medium 724 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    providing a resistor mesh with distributed sensing points in a security chip, wherein the resistor mesh comprises a plurality of parallel strings of resistors between two reference voltages, each string of resistors comprising a plurality of resistors in series, wherein a subset of resistors in each string has at least one sensing point at one terminal to allow for voltage measurements at said terminal;
    creating, by an algorithm processing circuit, a plurality of pairs of digital selection values wherein the algorithm processing circuit provides a pair of digital selection values at a time to an analog multiplexing circuit;
    receiving, at an input of the analog multiplexing circuit, the pair of digital selection values;
    producing, at an output of the analog multiplexing circuit, a respective differential voltage formed by a pair of voltages obtained at a pair of selected sensing points within the resistor mesh corresponding to the pair of digital selection values;
    converting, by an analog-to-digital converter, each differential voltage received from the analog multiplexing circuit into a corresponding digital output value;
    receiving, by the algorithm processing circuit, a respective digital output value associated with each pair of digital selection values; and
    deriving, by the algorithm processing circuit, a binary value based on a subset of the digital output values, wherein the binary value is unique to the security chip.

2. The method of claim 1, wherein providing the resistor mesh comprises:
    forming the resistor mesh using one or more interconnect metal layers adjacent to an external surface of the security chip.

3. The method of claim 1, wherein the respective differential voltages associated with the corresponding pairs of digital selection values are nominally equal, and produce statistical variation within the corresponding digital output values due to inherent mismatch between the individual resistors in the resistor mesh.

4. The method of claim 1, wherein the method further comprises:
    storing, as reference data, address values identifying the pair of sensing points associated with each digital output value in the subset of digital output values obtained during an enrollment phase of the security chip, wherein the reference data is to be used for a regeneration phase subsequent to the enrollment phase.

5. The method of claim 4, wherein the method further comprises:
    encrypting secure data with the binary value generated during the enrollment phase.

6. The method of claim 5, wherein the method further comprises:
    retrieving the stored reference data;
    identifying the pair of sensing points from the address values in the stored reference data;
    re-measuring differential voltages from the identified pairs of sensing points; and
    calculating a new binary value from the re-measured differential voltages.

7. The method of claim 6, wherein the method further comprises:
    decrypting the encrypted secure data with the newly calculated binary value, wherein the secure data was previously encrypted using the binary value calculated during the enrollment phase.

8. The method of claim 7, wherein the method further comprises:
responsive to decryption being successful, indicating that the security chip has not been tampered with.

9. The method of claim 4, wherein the method further comprises:
storing additional data during the enrollment phase to ensure integrity of the reference data for the regeneration phase.

10. The method of claim 9, wherein the additional data comprises at least one of a Message Authentication Code (MAC) value, or error correction code.

11. A tamper-detection circuit in a security chip comprising:
a resistor mesh with distributed sensing points, wherein the resistor mesh comprises a plurality of parallel strings of resistors between two reference voltages, each string of resistors comprising a plurality of resistors in series, wherein a subset of resistors in each string has at least one sensing point at one terminal to allow for voltage measurements at said terminal;
an analog multiplexing circuit that is configured to receive at an input a pair of digital selection values, and produce at its output a respective differential voltage formed by a pair of voltages obtained at a pair of selected sensing points within the resistor mesh corresponding to the pair of digital selection values;
an analog-to-digital converter that is configured to convert each differential voltage received from the analog multiplexing circuit into a corresponding digital output value; and
an algorithm processing circuit that is configured to:
create a plurality of pairs of digital selection values, and provide a pair of digital selection values at a time to the analog multiplexing switch;
receive, from the analog-to-digital converter, a respective digital output value associated with each pair of digital selection values; and
derive a binary value based on a subset of the digital output values, wherein the binary value is unique to the security chip.

12. The tamper-detection circuit of claim 11, wherein the resistor mesh is formed using one or more interconnect metal layers adjacent to an external surface of the security chip.

13. The tamper-detection circuit of claim 11, wherein the respective differential voltages associated with the corresponding pairs of digital selection values are nominally equal, and produce statistical variation within the corresponding digital output values due to inherent mismatch between the individual resistors in the resistor mesh.

14. The tamper-detection circuit of claim 11, wherein the tamper-detection circuit is further to:
store, as reference data, address values identifying the pair of sensing points associated with each digital output value in the subset of digital output values obtained during an enrollment phase of the security chip, wherein the reference data is to be used for a regeneration phase subsequent to the enrollment phase.

15. The tamper-detection circuit of claim 14, wherein
secure data is encrypted with the binary value generated by the algorithm processing circuit during the enrollment phase.

16. The tamper-detection circuit of claim 15, wherein the tamper-detection circuit is further to:
retrieve the stored reference data;
identify the pair of sensing points from the address values in the stored reference data;
re-measure differential voltages from the identified pairs of sensing points; and
calculate a new binary value from the re-measured differential voltages.

17. The tamper-detection circuit of claim 16, wherein
the encrypted secure data is decrypted with the newly calculated binary value, wherein the secure data was previously encrypted using the binary value calculated during the enrollment phase.

18. The tamper-detection circuit of claim 17, wherein a successful decryption indicates that the security chip has not been tampered with.

19. The tamper-detection circuit of claim 14, wherein the tamper-detection circuit is further to:
store additional data during the enrollment phase to ensure integrity of the reference data for the regeneration phase.

20. The tamper-detection circuit of claim 19, wherein the additional data comprises at least one of a Message Authentication Code (MAC) value, or error correction code.

* * * * *